United States Patent [19]
Fujii et al.

[11] Patent Number: 6,108,618
[45] Date of Patent: *Aug. 22, 2000

[54] METHOD FOR OPTICALLY TRANSMITTING SIGNALS IN MEASUREMENT UNITS AND MEASUREMENT SYSTEM EMPLOYING THE OPTICAL TRANSMISSION METHOD

[75] Inventors: Masaru Fujii, Kanagawa; Minoru Tanaka, Tokyo, both of Japan

[73] Assignee: Sony Corporation, Tokyo, Japan

[*] Notice: This patent is subject to a terminal disclaimer.

[21] Appl. No.: 09/365,417

[22] Filed: Aug. 2, 1999

Related U.S. Application Data

[63] Continuation of application No. 08/162,893, Dec. 8, 1993.

[30] Foreign Application Priority Data

| Dec. 9, 1992 | [JP] | Japan | P04-329566 |
| Dec. 17, 1992 | [JP] | Japan | P04-337424 |

[51] Int. Cl.[7] ................................. G01B 15/00
[52] U.S. Cl. ..................... 702/189; 702/188; 700/230
[58] Field of Search .................. 702/188, 189; 382/141, 143; 700/230, 56, 170

[56] References Cited

U.S. PATENT DOCUMENTS

| 4,460,826 | 7/1984 | Pryor | 250/227 |
| 4,784,493 | 11/1988 | Turcheck, Jr. et al. | 356/394 |
| 4,972,494 | 11/1990 | White et al. | 382/8 |
| 5,028,769 | 7/1991 | Claypool et al. | 235/454 |
| 5,146,357 | 9/1992 | Epstein | 359/152 |
| 5,334,249 | 8/1994 | Osbon | 118/679 |
| 5,379,237 | 1/1995 | Morgan et al. | 364/578 |
| 5,495,097 | 2/1996 | Katz et al. | 235/462 |
| 5,574,790 | 11/1996 | Liang et al. | 380/23 |
| 5,602,852 | 2/1997 | Shiobara | 370/455 |
| 5,666,417 | 9/1997 | Liang et al. | 380/23 |

OTHER PUBLICATIONS

Hatfield et al., "Fiber Optic LANs for the Manufacturing Environment", IEEE, 1988.

*Primary Examiner*—Patrick Assouad
*Attorney, Agent, or Firm*—Ronald P. Kananen; Rader, Fishman & Grauer

[57] ABSTRACT

A measurement device including a measurement unit, a signal processing unit having a serial interface and connected to the measurement unit for processing signals obtained at the measurement unit, and a photocoupler connected to the serial interface of the signal processing unit for converting processed signals into the optical information, is disclosed. A measurement system made up of a plurality of the measurement devices and a method for measuring an object using the measurement device are also disclosed.

24 Claims, 6 Drawing Sheets

METHOD FOR OPTICALLY TRANSMITTING SIGNALS IN MEASUREMENT UNITS AND MEASUREMENT SYSTEM EMPLOYING THE OPTICAL TRANSMISSION METHOD

This application is a continuation of Ser. No. 08/162,893 filed Dec. 8, 1993.

BACKGROUND OF THE INVENTION

This invention relates to a method for optically transmitting signals in measurement units, and a measurement system employing such optical transmission method.

It has hitherto been a normal method in the production process for television receivers or the like to inspect the assembling state using a plurality of measurement devices. For example, when inspecting the assembled state of television receivers by a plurality of measurement devices placed along a belt conveyor, it becomes necessary to transmit information signals between the measurement devices. For such case, it has been customary to perform signal transmission using communication systems such as RS232C or GPIB signal format.

However, such signal transmission makes use of electric cables, and insulation between the measurement devices cannot be achieved, so that there is a risk of circuit destruction due to the difference in the ground potential between the different measurement devices. Besides, connection by electric cables is not desirable because signal transmission by the cable is performed at a site where the noise is likely to be picked up, such as an assembly line.

In addition, it is difficult to raise the information transfer speed with the above enumerated communication systems, so that, if the number of measurement devices connected to the inspection system is increased, it becomes difficult to achieve smooth signal transmission.

SUMMARY OF THE INVENTION

The present invention provides novel measurement device and method employing optical fiber communication. The measurement device necessary for executing the present invention translates the information to be measured into optical signals using a photocoupler and a signal processor having a serial interface enclosed therein, and executes transmission of information signals over an optical fiber cable.

According to the present invention, a plurality of the input/output devices, each including a display device and a signal processing device, are interconnected by an optical fiber cable. The measurement device in the present invention may comprise a television camera, in which case an image processing device may be included in the television camera for providing a more compact system.

The measurement device may be further reduced in size by employing an input/output device in which the display device, the signal processing device and the input keyboard are housed integrally. In such case, the measurement device and the input/output device are interconnected by a fiber cable for light transmission.

DESCRIPTION OF THE PREFERRED EMBODIMENTS

Figure 1:
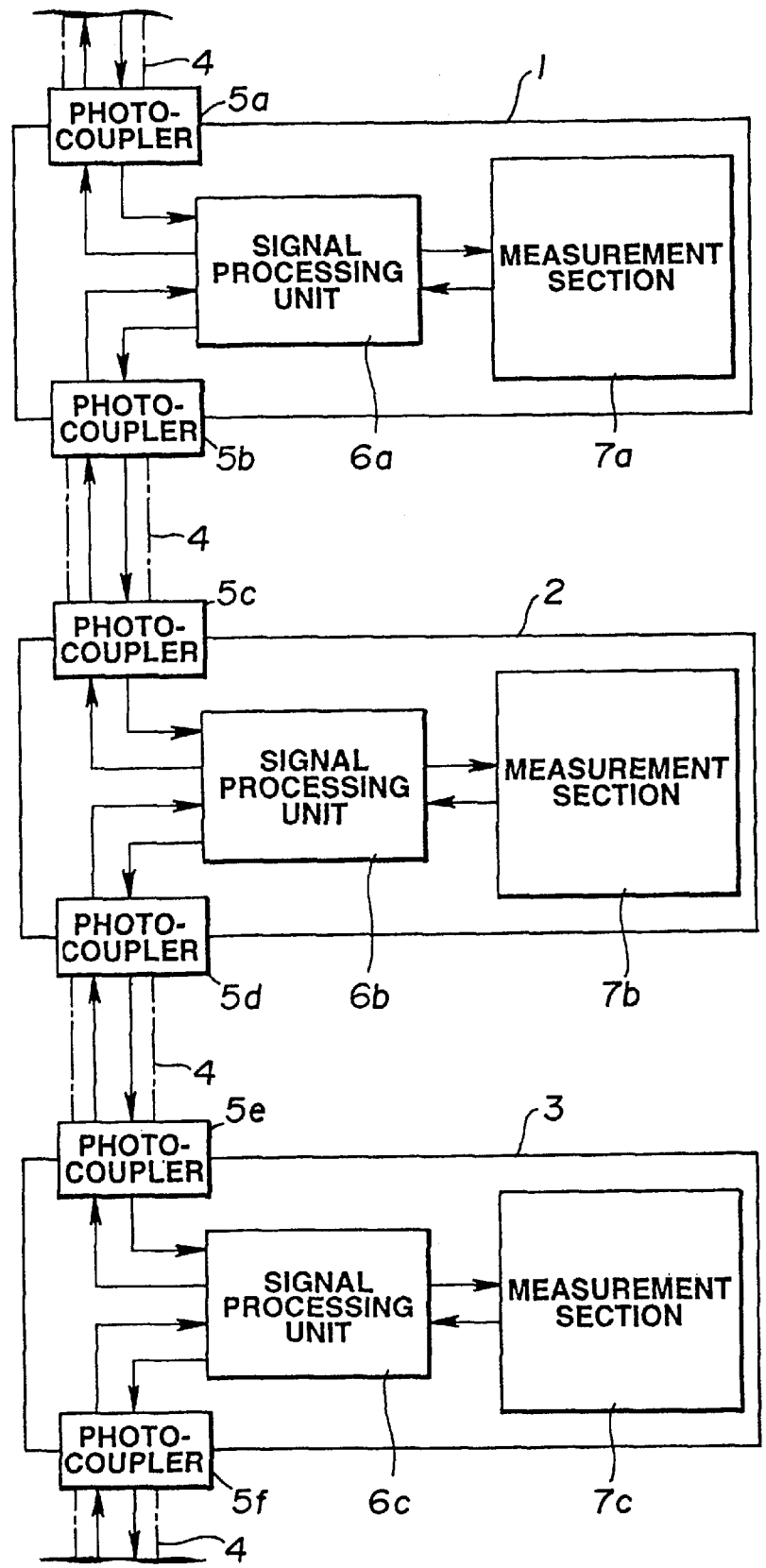
FIG. 1 is a top plan view showing a general layout of signal transmission by plural measurement devices.

Referring to the drawings, illustrative embodiments of the present invention will be explained in detail.

The optical signal communication method with the measurement device according to the present invention is employed for transmission of information signals between plural measurement devices. With the communication method according to the present invention, each measurement device includes a photocoupler and a signal processing unit having an interface enclosed therein. The photocouplers of the measurement devices are interconnected by an optical fiber to execute transmission of the information.

The signal communication method by the measurement device according to the present invention is executed by a signal communication device having measurement units shown in FIG. 1. That is, a plurality of signal processing units 6a, 6b and 6c and a plurality of photocouplers 5a, 5b, 5c, 5d, 5e and 5f are provided in each of a plurality of measurement units 1, 2 and 3.

Figure 2:
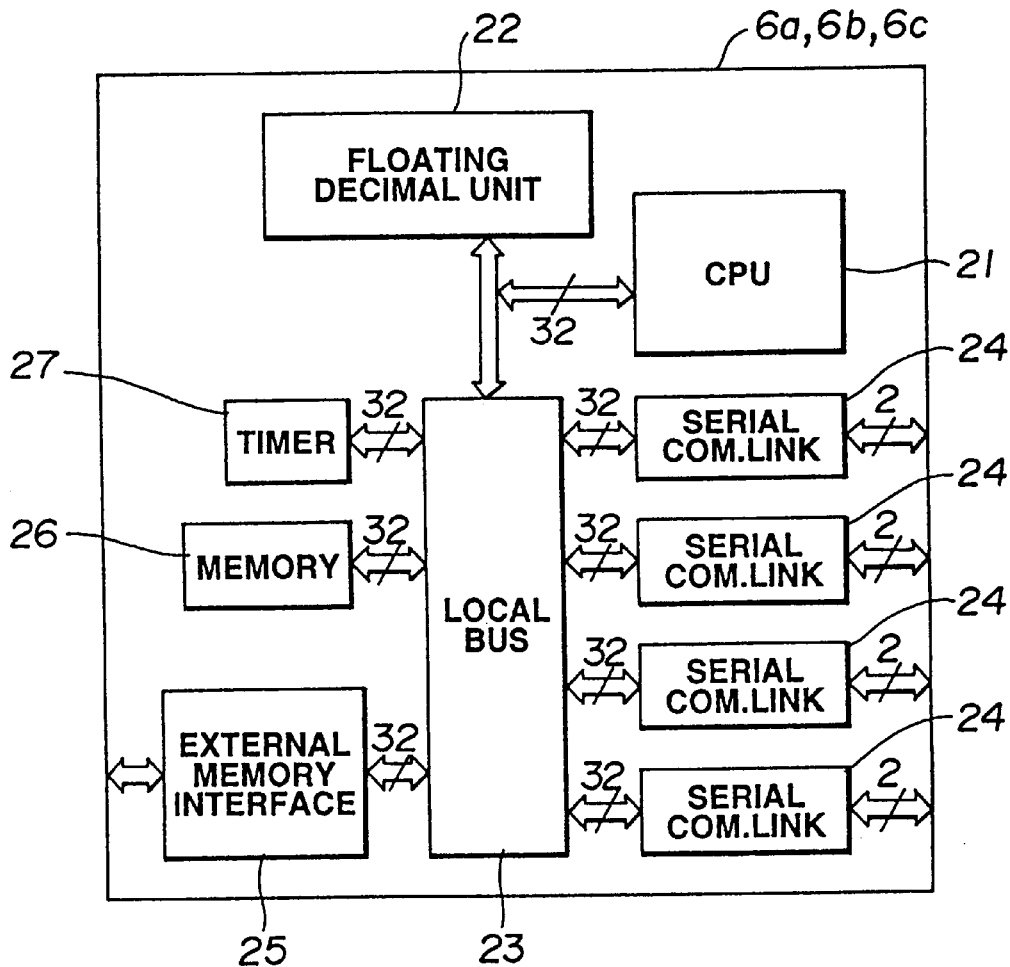
FIG. 2 is a schematic block diagram showing a signal processing device shown in FIG. 1.

Each of the signal processing units 6a, 6b and 6c is a signal processor having a 32-bit central processing unit (CPU) 21, as an example, as shown in FIG. 2. Each of the signal processing units 6a, 6b and 6c has a plurality of serial communication links 24 connected to the CPU 21 by a local bus 23.

Each of the signal processing units 6a, 6b and 6c also includes a memory 26 operated under control by the CPU 21, a timer 27 and an external memory interface 25 connected to an external memory, not shown. Thus it is possible for the CPU 21 of each of the signal processing units 6a, 6b and 6c to have communication of information signals with outside over the local bus 23 and the serial communication links 24. Such communication of the information signals is executed by direct memory accessing (DMA) so that transmission of the information at a rate of 20 M bits/sec is possible by bi-directional communication. As the signal processors 6a, 6b and 6c, a transputer manufactured by SGS Thomson Inc. under the trade name of IMST-805 may be employed.

Figure 3:
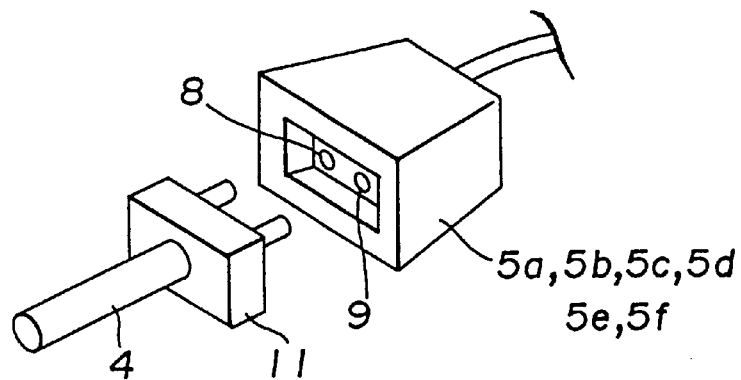
FIG. 3 is a perspective view showing a photocoupler connected to a serial communication link.

The photocouplers 5a, 5b, 5c, 5d, 5e and 5f, shown in FIG. 3, are connected to each serial communication link 24. Each of the photocouplers 5a, 5b, 5c, 5d, 5e and 5f includes a light emitting section 8 made up of a light emitting diode or a laser diode, and a light receiving section 9 formed by a photodiode or a phototransistor. The light emitting section 8 emits light in a pulsed fashion responsive to digital information signals transmitted from the CPU 21 via the serial communication links 24. The light receiving section 9 receives the light transmitted from outside for translation into digital information signals which are supplied over the serial communication links 24 to the CPU 21.

The light emitting section 8 and the light receiving section 9 are arranged in a socket 10 provided on the front side of a casing member. An optical fiber 4 is coupled via a plug 11 to the socket 10. The photocouplers 5a to 5f execute information transmission, at the above-mentioned rate of 20 M bits/sec, using the non-return to zero (NRZ) code for the transmission signals.

The signal processors 6a, 6b and 6c are connected to measurement sections 7a, 7b and 7c, respectively. A variety of functions may be associated with the measurement sections 7a, 7b and 7c. For example, it is possible for the measurement sections 7a to 7c to measure the length or weight or capture an image and to exchange signals with the signal processors 6a to 6c connected thereto. That is, the measurement sections 7a to 7c are controlled by control signals from the signal processors 6a to 6c and the measured results are transmitted to the signal processors 6a to 6c.

In this manner, the signal processor 6a, photocouplers 5a, 5b and the measurement section 7a make up the measurement unit 1, while the signal processor 6b, photocouplers 5c, 5d and the measurement section 7b make up the measurement unit 2 and the signal processor 6c, photocouplers 5e, 5f and the measurement section 7c make up the measurement unit 3. Although a sole signal processor and a sole measurement section are included in FIG. 1 in a measurement unit, there may be occasions where a plurality of signal processors and measurement sections are provided in one measurement unit.

Figure 4:
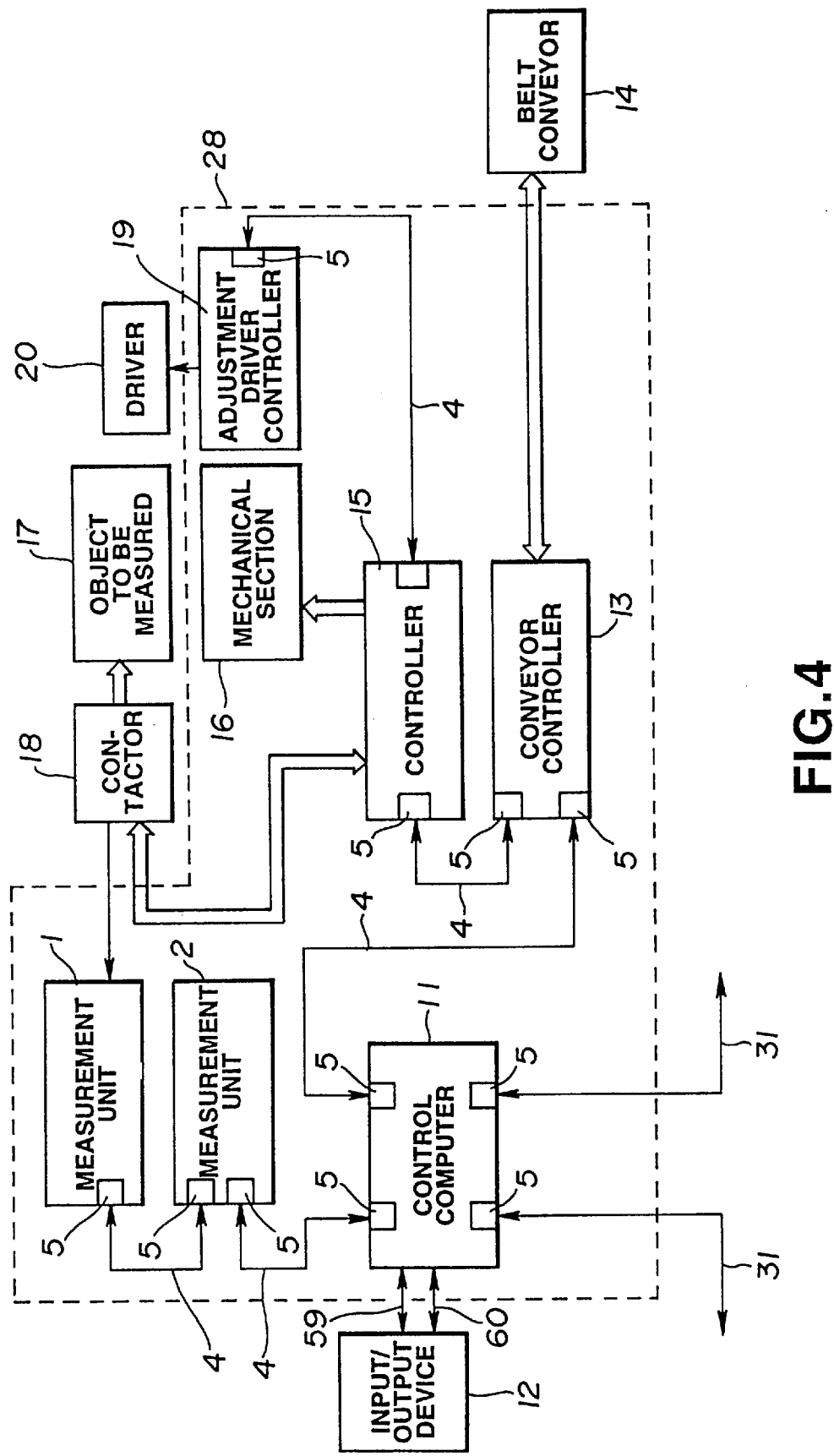
FIG. 4 is a schematic block diagram showing a modification of the measurement device shown in FIG. 1.
Figure 5:
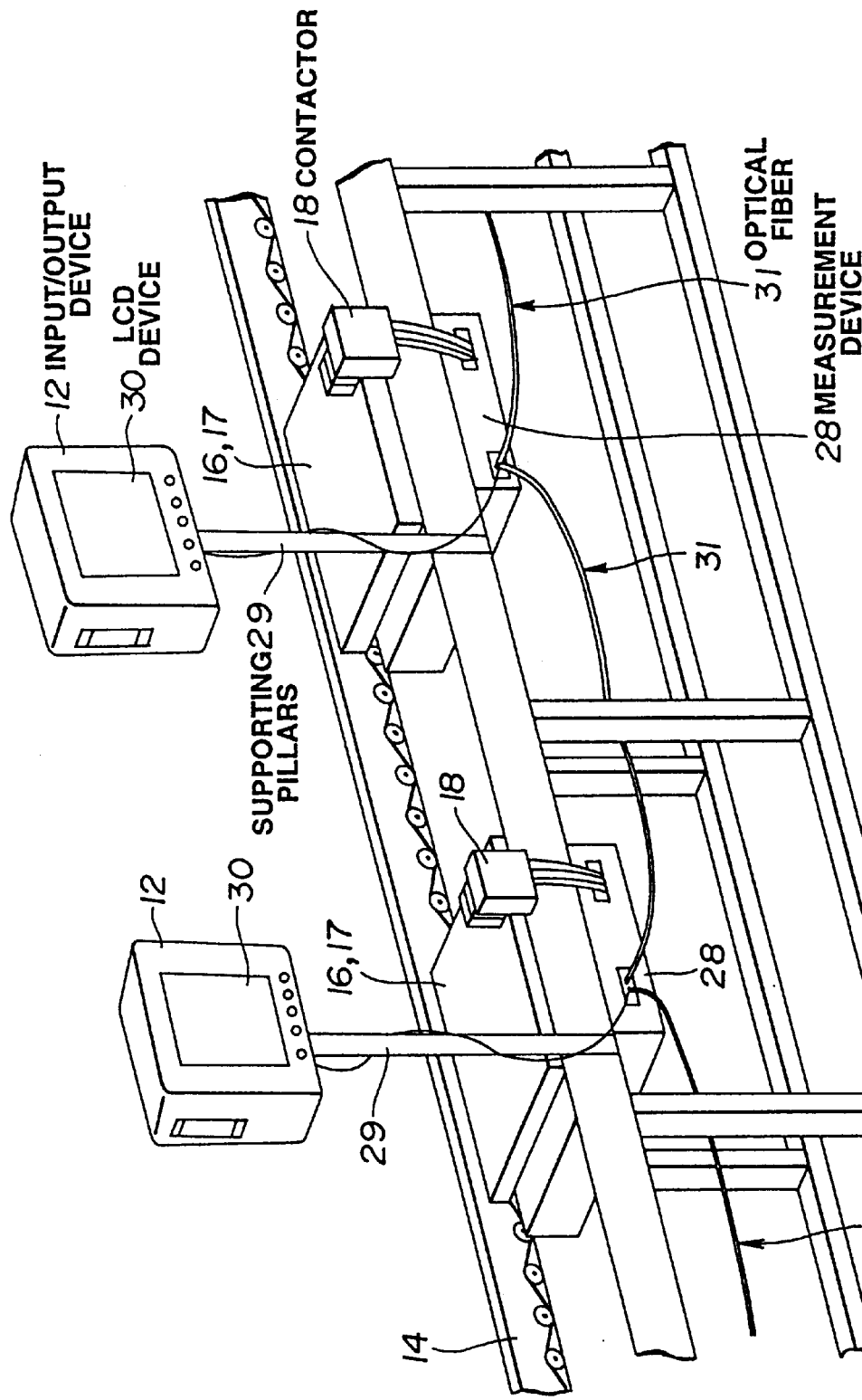
FIG. 5 is a partial perspective view showing a measurement system employing plural measurement devices.

A measurement device 28 employing the above-mentioned measurement units are shown in FIGS. 4 and 5. That is, the measurement device 28 includes a control computer 11 and, in an embodiment shown in FIG. 4, the measurement units 1 and 2 are connected via the optical fiber 4 to the control computer 11. The control computer 11 includes an input/output device 12 and a contactor 18 connected to the measurement section of the measurement unit. The input/output device 12 includes an indicator and a keyboard, not shown.

A plurality of the measurement devices 28 are incorporated into a production line, as shown in FIG. 5. A plurality of the input/output devices 12 are mounted on supporting pillars 29. Each of the input/output devices 12 includes a liquid crystal display device (LCD). A plurality of the contractors 18 are connected to a plurality of objects to be measured 17, while being connected to the measurement devices 28 by flexible cables.

The measurement devices are employed for such a case in which the objects to be measured 17, each placed on a palette transported on a belt conveyor 14, are assembled while measurement operations are performed thereon. Meanwhile, a mechanical section 16 includes an electric motor and a plunger for controlling the palette. The measurement devices are supported on the bottom of the belt conveyor 14 and arrayed along the belt conveyor 14. The measurement devices 28 are interconnected by an optical fiber 31 for signal transmission between the measurement devices 28.

Referring to FIG. 4, the measurement device 28 includes a conveyor control section 13 connected to the control computer 11 by the optical fiber 4 for controlling the movement of the belt conveyor 14. Besides, the conveyor control section 13 is connected to a controller 15 by the optical fiber 4. The controller 15 controls the contactor 18, mechanical section 16 and an adjustment driver controller 19 which controls a screw driver 20 adapted for adjusting an adjustment screw of the object to be measured 17.

Meanwhile, the serial communication link shown in FIG. 2 is enclosed within each of the control computer 11 conveyor control section 13 and the adjustment driver controller 19 for enabling light communication at a rate of 20 M bits/sec.

Figure 6:
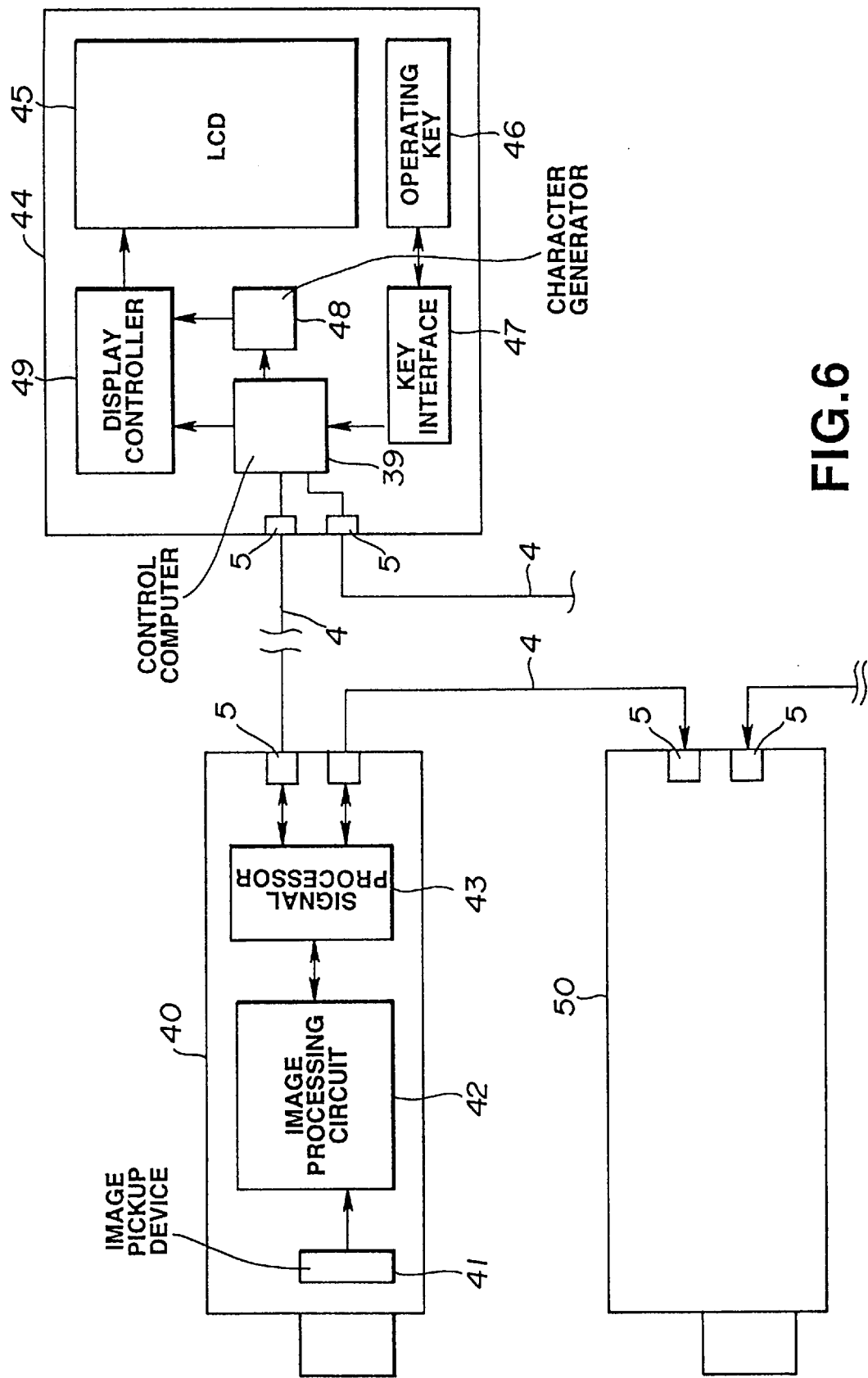
FIG. 6 is a schematic block diagram showing a modification of the measurement device.

FIG. 6 shows a modification in which the control computer 11 shown in FIG. 5 is integrally formed with the input/output device 12. That is, an input/output device 44 includes a control computer 39 therein and an operating key 46 connected to the control computer 39 via a key interface 47. The control computer 39 controls a display controller 49 to cause an image to be displayed on an LCD 45 along with an output of character generator 48.

As explained in connection with FIG. 4, a signal processor having a serial interface enclosed therein is included in the control computer 39 for having communication with the outside via the photocoupler 5. A cathode ray tube (CRT) may naturally be employed in place of the LCD 45.

In an embodiment shown in FIG. 6, a television camera 40 is employed as a measurement device. The television camera 40 includes an image pickup device 41, an image processing circuit 42 including an A/D converter and a signal processor 43. The signal processor 43 naturally corresponds to the signal processor shown in FIG. 2 and includes a serial communication link. Thus the video signals produced by the image pickup unit 41 are translated by the image processing circuit 42 into digital signals which are transmitted from the photocoupler 5 to the control computer 39 of the input/output device 44 via the optical fiber 4.

Figure 7:
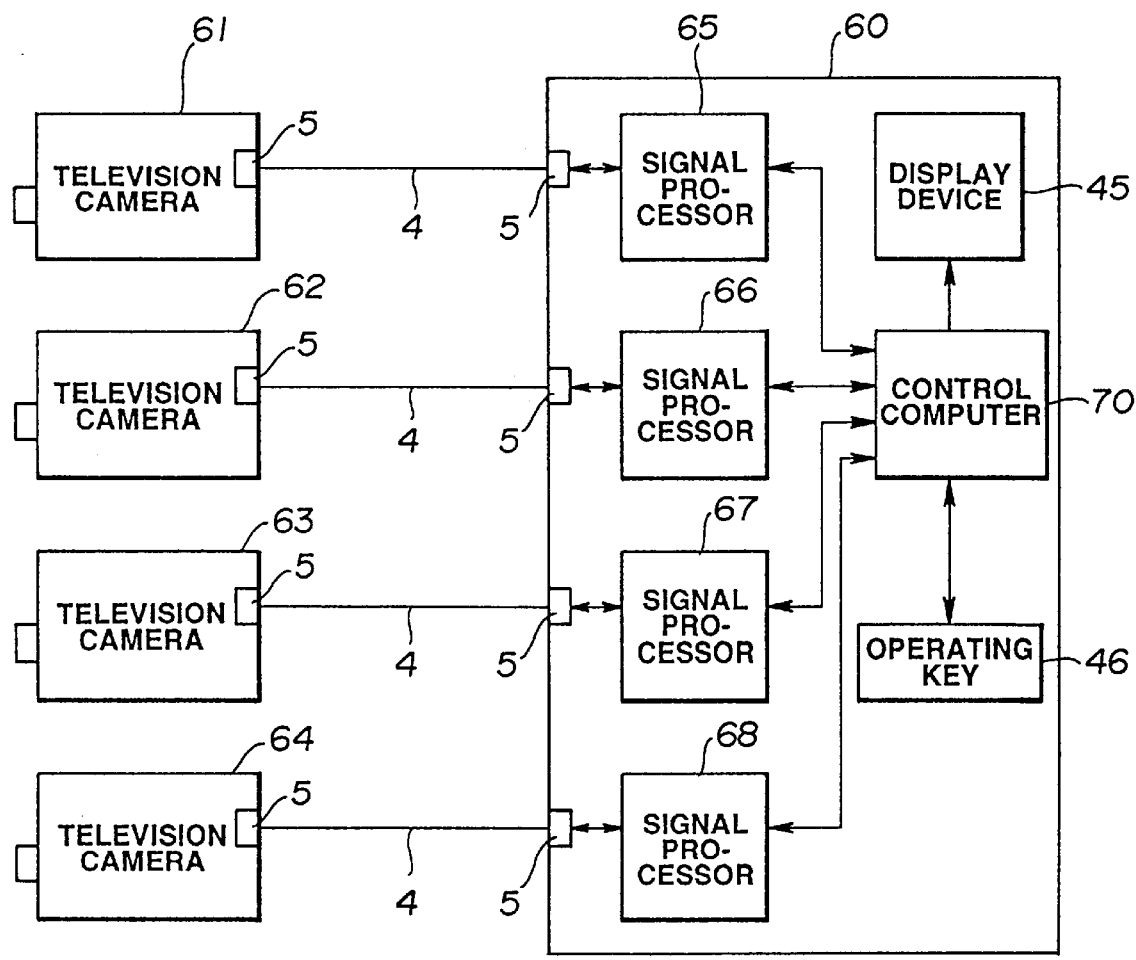
FIG. 7 is a schematic block diagram showing another modification of the measurement device.

In the embodiment shown in FIG. 6, outputs of plural television cameras 40, 50 are sequentially processed in a pre-set manner by the control computer 39. High-speed image processing may be achieved by providing plural signal processors 65, 66, 67 and 68 in the input/output device 60 as shown in FIG. 7 for parallel processing of digital video signals from television cameras 61, 62, 63 and 64. These signal processors 65 to 68 are connected to a control computer 70 for processing the signals in accordance with the control information from the operating key 46. The results of the processing are displayed on a display device 45.

If a plurality of television camera are employed in this manner, the present invention is employed on the production line as shown in FIG. 8. That is, a plurality of the television cameras 61, 62 and 63 are arranged along the belt conveyor 14. These television cameras 61 to 63 are arranged for imaging a sole object 67 from different angles. The results of measurement are processed by the input/output device 60 having the image processing unit enclosed therein.

What is claimed is:

1. A measurement device for use in a production line, comprising:

at least one measuring unit for acquiring data on objects traveling on a conveyor belt along said production line;

a signal processing unit connected to said measuring unit for processing signals obtained at said measuring unit, said signal processing unit having a photocoupler connected to an optical interface for converting processed signals into optical data signals;

a control computer for receiving and processing said optical data signals; and a conveyor controller having a photocoupler and being optically connected to said control computer for controlling movement of said conveyor belt in response to a control signal from said control computer which is generated by said control computer in response to said optical data signals from said at least one measuring unit.

2. A measurement device as claimed in claim 1, further comprising a plurality of said measuring units spaced along said conveyor belt, wherein each of said measuring units comprises a signal processing unit with a photocoupler and optical interface, said measuring units being optically connected in series via an optical fiber cable connected between said optical interfaces of said measuring units.

3. A measurement device as claimed in claim 1, wherein said measurement unit includes an imager for imaging an object to be measured.

4. A measurement device as claimed in claim 1, wherein said control computer is coupled to said signal processing unit via said photocoupler via an optical fiber cable.

5. A measurement device as claimed in claim 3, wherein said imager is housed in an imager housing which further includes an image processing circuit for processing image signals generated by said imager.

6. A measurement device as claimed in claim 1, further comprising an input/output device including a display device, an input device, a photocoupler and a second signal processing unit housed within a housing, said input/output device being coupled to the signal processing unit of said measuring unit.

7. A measurement device as claimed in claim 1, further comprising a display device coupled to said control computer for displaying results of said processing performed by said control computer.

8. A measurement device as claimed in claim 1, wherein said signal processing unit comprises:
    at least one serial communications link to said measuring unit;
    a central processing unit; and
    a local bus connecting said at least one serial communications link to said central processing unit.

9. A measurement device as claimed in claim 8, further comprising a memory unit connected to said local bus.

10. A measurement device as claimed in claim 8, further comprising an external memory interface connected to said local bus.

11. A measurement device as claimed in claim 8, further comprising a timer connected to said local bus.

12. A measurement device as claimed in claim 1, wherein said photocoupler comprises:
    an optical signal emitter;
    a light detector for detecting an optical signal; and
    a casing in which said optical signal emitter and said light detector are disposed and into which said optical interface is received.

13. A method of transmitting measurement data from a plurality of spaced locations along a production line to a signal processor, the method comprising:
    measuring desired information from an object at each of said spaced locations;
    generating optical data signals based on said desired information at each of said spaced locations; and
    transmitting said optical data signals serially along a fiber optical cable which connects each of said spaced locations, in series, with said signal processor.

14. A method for transmitting measurement data to a signal processor as claimed in claim 13, wherein said measuring desired information from an object comprises imaging said object.

15. A method for transmitting measurement data to a signal processor as claimed in claim 14, wherein said imaging said object comprises producing image data in a parallel signal format, said method further comprising converting said parallel image data to serial data for transmission over said fiber optical cable.

16. A measurement device for use in a production line, comprising:
    at least one measuring means for acquiring data on objects traveling on a conveyor means along said production line;
    a signal processing means connected to said measuring means for processing signals obtained at said measuring means, said signal processing means having an optical signaling means connected to an optical interface for converting processed signals into optical data signals;
    a control means for receiving and processing said optical data signals; and
    a conveyor controller means optically connected to said control means for controlling movement of said conveyor means in response to a control signal from said control means which is generated by said control means in response to said optical data signals from said at least one measuring means.

17. A measurement device as claimed in claim 16, further comprising a plurality of said measuring means spaced along said conveyor means, wherein each of said measuring means comprise a signal processing means with an optical signaling means and optical interface, said measuring means being optically connected in series via an optical signal carrier means connected between said optical interfaces of said measuring means.

18. A measurement device as claimed in claim 16, wherein said measurement means includes an imaging means for imaging an object to be measured.

19. A measurement device as claimed in claim 16, wherein said control means are coupled to said signal processing means via said optical signaling means.

20. A measurement device as claimed in claim 7, wherein said control computer and said display apparatus are housed in a display housing which also includes a plurality of switch buttons for entering commands to said control computer.

21. A measuring device for use in a production line for acquiring data on objects traveling along a conveyor belt, said measuring device having a portion located at each of a plurality of spaced locations along said conveyor belt and comprising:
    (a) a measuring unit located at each of said spaced locations along said conveyor belt for acquiring data on each of said objects traveling along said conveyor belt and for generating signals indicative of said data;
    (b) a signal processing unit located at each of said spaced locations along said conveyor belt and connected to a respective measuring unit, wherein said signal processing unit processes signals obtained from said measuring unit and has a serial interface and a photocoupler connected to said serial interface of said signal processing unit for converting processed signals into optical information signals;
    (c) optical fibers for interconnecting the photocouplers in the signal processing units to each other and for conducting the optical information signals between signal processing units;
    (d) a control computer coupled to one signal processing unit via the photocoupler and an optical fiber associated with that one signal processing unit, wherein said control computer processes the optical information signals from the signal processing units;
    (e) a display device coupled to said control computer for displaying results of processing of said optical information signals by said control computer; and (f) an adjustment driver controller which is controlled by said control computer via an optical fiber link, wherein said adjustment drive controller controls an adjustment device for making an adjustment to at least one of said objects traveling along said conveyor belt.

22. A measuring device as claimed in claim 21, wherein said adjustment device is a screw driver for adjusting a screw on at least one of said objects.

23. A measuring device for use in a production line for acquiring data on objects traveling along a conveyor belt, said measuring device having a portion located at each of a plurality of spaced locations along said conveyor belt and comprising:

(a) a measuring unit located at each of said spaced locations along said conveyor belt for acquiring data on each of said objects traveling along said conveyor belt and for generating signals indicative of said data;

(b) a signal processing unit located at each of said spaced locations along said conveyor belt and connected to a respective measuring unit, wherein said signal processing unit processes signals obtained from said measuring unit and has a serial interface and a photocoupler connected to said serial interface of said signal processing unit for converting processed signals into optical information signals;

(c) optical fibers for interconnecting the photocouplers in the signal processing units to each other and for conducting the optical information signals between signal processing units;

(d) a control computer coupled to one signal processing unit via the photocoupler and an optical fiber associated with that one signal processing unit, wherein said control computer processes the optical information signals from the signal processing units;

(e) a display device coupled to said control computer for displaying results of processing of said optical information signals by said control computer; and (f) a controller having a photocoupler coupled to said computer by an optical fiber, said controller controlling a mechanical section at least including a motor.

24. A measuring device as claimed in claim 23, wherein said mechanical section further comprises a plunger operated by said motor for adjusting a position of pallets on said conveyor belt, said pallets having said objects disposed thereon.

* * * * *